United States Patent
Sexton et al.

(10) Patent No.: US 11,221,242 B1
(45) Date of Patent: Jan. 11, 2022

(54) APPARATUS AND METHOD FOR MONITORING LIQUID AND GAS FLOW THROUGH A FLOW METER

(71) Applicant: Vata Verks Inc., Arlington, MA (US)

(72) Inventors: Daniel White Sexton, Niskayuna, NY (US); Alex Cheimets, Arlington, MA (US)

(73) Assignee: Vata Verks Inc., Arlington, MA (US)

( * ) Notice: Subject to any disclaimer, the term of this patent is extended or adjusted under 35 U.S.C. 154(b) by 0 days.

(21) Appl. No.: 17/417,726

(22) PCT Filed: Dec. 16, 2019

(86) PCT No.: PCT/US2019/066471
§ 371 (c)(1),
(2) Date: Jun. 23, 2021

(87) PCT Pub. No.: WO2020/139594
PCT Pub. Date: Jul. 2, 2020

Related U.S. Application Data

(63) Continuation of application No. 16/556,327, filed on Aug. 30, 2019.
(Continued)

(51) Int. Cl.
*G01F 1/58* (2006.01)
*G01P 15/18* (2013.01)
(Continued)

(52) U.S. Cl.
CPC ............. *G01F 1/582* (2013.01); *G01H 17/00* (2013.01); *G01K 13/00* (2013.01); *G01M 3/00* (2013.01); *G01P 15/18* (2013.01)

(58) Field of Classification Search
CPC .......... G01P 15/18; G01M 3/00; G01K 13/00; G01H 17/00; G01F 1/582
(Continued)

(56) References Cited

U.S. PATENT DOCUMENTS 7,607,362 B1   10/2009   Brost
8,051,723 B2   11/2011   Hendey et al.
(Continued)

FOREIGN PATENT DOCUMENTS

WO   2009150450   12/2009

*Primary Examiner* — Aditya S Bhat
(74) *Attorney, Agent, or Firm* — Jay R. Yablon

(57) ABSTRACT

A system and related method for precisely monitoring fluid or gas flows, comprising: a flow meter comprising a mechanical metering component; the mechanical metering component comprising a ferrous material; a three-axis magnetic field sensor for sensing fluctuations of a magnetic field arising from movements of the ferrous material, and specifically, for sensing a magnetic field vector of the magnetic field; computer processing for receiving data from the magnetic field sensor and storing magnetic field behavior data representing time behavior of the magnetic field vector in three space dimensions; calibration programming for analyzing and learning a magnetic signature of the meter; programming for storing a unique calibration pattern of the magnetic signature representing baseline behaviors thereof; and comparison programming for comparing behaviors of the magnetic field during operation with the calibrated baseline behaviors and thereby deducing flows which are occurring during operation as a function of time under various conditions.

22 Claims, 11 Drawing Sheets

Related U.S. Application Data

(60) Provisional application No. 62/784,884, filed on Dec. 26, 2018.

(51) Int. Cl.
*G01M 3/00* (2006.01)
*G01K 13/00* (2021.01)
*G01H 17/00* (2006.01)

(58) Field of Classification Search
USPC .................................................. 73/861.06
See application file for complete search history.

(56) References Cited

U.S. PATENT DOCUMENTS

| | | | |
|---|---|---|---|
| 9,470,563 B1 | 10/2016 | DeVerse | |
| 2002/0145568 A1 | 10/2002 | Winter | |
| 2017/0335550 A1* | 11/2017 | Sterling | ............... E03B 7/072 |

* cited by examiner

APPARATUS AND METHOD FOR MONITORING LIQUID AND GAS FLOW THROUGH A FLOW METER

CROSS REFERENCE TO RELATED APPLICATIONS

This application claims priority benefit of, and is a continuation of, U.S. application Ser. No. 16/556,327 filed Aug. 30, 2019. This application also claims priority of provisional application U.S. 62/784,884 filed Dec. 26, 2018.

BACKGROUND OF THE INVENTION

The subject matter disclosed herein generally relates to the instrumentation of flow meters that utilize a rotating or nutating magnet to drive a mechanical or electronic register and diaphragm meters that use a series of diaphragms which drive mechanical arms and thus drive a mechanical or electronic register.

It is well understood that meters, primarily used for the measurement of fluids (such as water) or gas (such as natural gas) may contain a magnet inside the chamber where the fluid or gas passes. This magnet may rotate or nutate as the fluid or gas passes through. A register is attached outside the chamber which contains a mechanical or electronic mechanism that records the motions of the internal chamber by sensing the changing magnetic field. In this way the chamber where the fluid or gas passes can be completely sealed to prevent any leaks. This invention utilizes magnetometers to detect and track this changing magnetic field in parallel to the register so that an electronic device that independently reports the flow can be easily attached on the existing meter without replacing the existing meter or modifying (cutting or drilling) the existing pipe.

Many articles and videos have been published which demonstrate the ability to sense and record this magnetic field. One such product offered by Water Hero utilizes a magnetic field sensor to detect and track the magnetic field specifically for municipal water meters.

A large number of insurance claims are caused by plumbing leaks (slow leaks, pipe bursts, forgetful users, etc.). This system employs a simple add-on sensor which can very accurately sense flow utilizing existing installed meters. No expert trade skills are required for the installation. The measurement is much more precise than what is available from the register of the meter itself. By analyzing and reporting this data in real time, even small leaks can be detected and the owner informed. Large leaks, such as pipe burst can also be identified. This can reduce or eliminate these leak-related claims.

Additionally, usage patterns can be identified and disaggregated so that with some degree of certainty, the consumer can identify the usage for each appliance attached to the resource. A system utilizing a plethora of sensors including gas, water and electric can also identify usage patterns but over a wider range of devices. When water or gas usage is included this can provide more accurate information.

Meter tampering is also a problem for utilities. It is becoming well-understood that a strong magnet next to a municipal or utility meter will cause it to under report the usage. This results in lost revenue for the utility or municipality and can be difficult to detect particularly since both utilities and municipalities are installing automatic meter reading systems and service personnel are no longer employed to inspect and read the meters on a frequent basis. A system which is detecting the magnetic field within the meter can also detect when a magnet strong enough to interfere with the operation of the meter itself has been introduced for tampering. Meter tampering of this type can then be reported back to the provider.

Many natural gas meters operate using the same nutating shaft and magnet method just reviewed. However, there is a large population of natural gas meters which use a series of diaphragms that expand and contract. These drive a series of mechanical levers that in turn rotate counters which record flow. These meters do not have an internal magnet. However existing magnetic fields in the environment (such as the earth's magnetic field) will be altered or fluctuate by the position of ferrous metal objects in close proximity to sensor. These fluctuations, although not as smooth as those encountered in a rotating meter, can also be measured and a repetitive pattern learned. Once the pattern is learned the meter measurements can be tracked just as previously described.

As new customers for natural gas are added to an existing infrastructure of municipal gas delivery systems, delivery guarantees can become impossible to meet without upgrading or adding to existing underground pipes, compressors and other delivery infrastructure. This is very expensive. And just as the electric distribution system faces an issue with peak demand so does the gas distribution system. One important use case for add-on gas meter monitoring is demand-side management where gas companies can work with consumers to regulate demand. By monitoring gas flow and time, gas companies can set up peak time usage billing structures and direct consumer feedback systems to help level the load on the distribution system thereby eliminating the need for new infrastructure. Demand side management requires continuous real time monitoring and reporting Meter monitoring for individuals or home owners is something that a hobbyist might be interested in, but the majority of consumers find it just one more thing to look at. Larger companies such as building system management companies, energy aggregators or utilities have managed large systems and are much more interested in monitoring each delivery point. However, these types of customers want to own the data produced by their systems. They have their own engineering staffs capable of data analytics. They want to own their data and are not very interested in having to pay for access to that data. This makes it hard for a company to sell a monitoring product and to rely on recurring revenue by selling data access. A company producing products in this business must then find different ways to add value. One such way is not by selling data but by providing continued device maintenance. However, this requires that device upgrades and revisions are tightly-controlled and secure on a device by device basis.

SUMMARY OF THE INVENTION

Disclosed herein is a system for precisely monitoring fluid or gas flows, comprising: a flow meter comprising a mechanical metering component; the mechanical metering component comprising a ferrous material; a three-axis magnetic field sensor for sensing fluctuations of a magnetic field, the fluctuations arising from movements of the ferrous material, and specifically, for sensing a magnetic field vector of the magnetic field comprising a magnitude and direction in three space dimensions of the magnetic field between south and north poles thereof; a computer processor and non-transient storage containing programming therein, for receiving data from the magnetic field sensor and storing magnetic field behavior data representing the time behavior of the magnetic field vector in the three space dimensions; calibration programming in the computer storage for analyzing and learning a magnetic signature of the meter; programming for storing a unique calibration pattern of the magnetic signature to represent baseline behaviors thereof; and comparison programming for comparing behaviors of the magnetic field during operation with the calibrated baseline behaviors and thereby deducing the flows which are occurring during the operation as a function of time under various conditions.

The approaches described herein relates to the collection of data from multiple sensors, recording this data and providing timely feedback that can be used by a building owner to make improvements in conservation or to provide early detection of problems or anomalies.

In contrast, present approaches require skilled labor to install expensive sensors or do not offer measurements precise enough to detect small leaks.

In one of these embodiments, a magnetic sensor is strapped to the water meter and is used to control an electronic valve to automatically shut the flow off if an extended period of high flow is detected. In contrast, the prior art does not have the ability to detect extremely low flows or small leaks lacking a high enough sampling rate. Rather, due to the mechanism used to process the magnetic field information, the resolution is limited to a single revolution.

BRIEF DESCRIPTION OF THE DRAWINGS

The features of the invention believed to be novel are set forth in the appended claims. The invention, however, together with further objects and advantages thereof, may best be understood by reference to the following description taken in conjunction with the accompanying drawing(s) summarized below.

Figure 1:
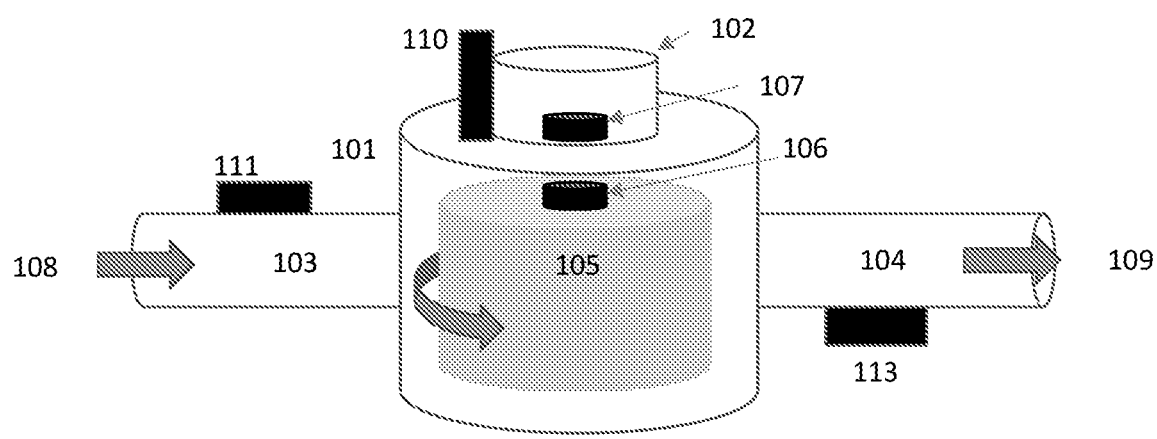
FIG. 1 comprises a rough diagram of a meter with a register attached.
Figure 1:
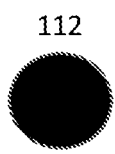

Skilled artisans will appreciate that elements in the figures are illustrated for simplicity and clarity. It will further be appreciated that certain actions and/or steps may be described or depicted in a particular order of occurrence while those skilled in the art will understand that such specificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION

The approaches described herein allow for various options for sensors and the associated data processing to extract and display specific usage data that a property owner, property manager, resource consumer or resource aggregator would be interested in.

In one aspect, the present approaches provide interconnectivity between devices, and sensors which may be co-located with the data collection and sensors which may be at specific points within a building. Water flow rate sensors placed on existing water meters can provide information about how much water is being used at a certain point in time. Gas flow rate sensors placed on existing gas meters can provide information on how much gas is used at a certain point in time. Electricity usage can be detected by attaching a magnetic field sensor around the electrical wiring and can provide information about how much electricity is used at a certain point in time. Either together or taken separately this information can be used to disaggregate what devices in the building are using resources, how often they are in use, how efficiently they are operating or how efficiently they are being used. Additional information such as building occupancy can also be detected to provide additional building security information. In the case where equipment is attached to a water system (whether it be residential equipment such as a dish washer or clothes washer or industrial equipment such as a water cutter or irrigation system), information about the operational efficiency or health of the equipment can be provided. In some cases only the water usage information will be available and disaggregation will occur using that data alone.

In one embodiment, a three-axis magnetometer is used on the outside of an existing municipal flow meter or a flow meter provided by a utility or a flow meter used for sub-metering provided by the property owner or manager. A single or multi-axis accelerometer may also be attached to detect vibrations from oscillations in flow (water hammer) or to detect extremely low flows which are below the measurement capabilities of the existing meter itself. They can also be used to detect if the unit has been removed or tampered with or if an additional strong magnetic field has been introduced that is sufficient enough to prevent the meter from reading properly. Acoustic or ultrasonic sensors can also be used to detect activity or flow within the pipe. Temperature sensors are also included to detect possible freeze conditions or provide warnings whenever the environment around the meter goes above or below expected normal values. Humidity sensors are also included so that environmental conditions which can damage the unit or the surroundings are detected. Information from other sources such as Internet weather sites or sensors from other systems within the building on nearby either outside the building or in other buildings can also be used. These sensors either separately or in aggregation can provide information on how much of a particular resource is being consumed, the environment around the meter and any signs of tampering.

The attached sensors can be used to determine the internal rotations or motions within the meter and therefore what the meter has measured. In some cases, a meter is designed to only report positive flow or flow in one direction; negative flow or backflow is not recorded or is ignored. This invention can detect and report flow in both directions eliminating some over-reporting of consumption. This device can also be used to determine the mechanical integrity of the meter. As the meter wears the signature of the internal magnetic field will change, and these changes can be detected by the invention. The meter may also begin to make internal noises or vibrations which are not normal for a meter operating properly. This information can be analyzed and an indication of maintenance required can be provided to the owner.

In another embodiment, data from the sensors is time stamped based on a local onboard clock and stored locally within a nonvolatile memory cartridge which may be fixed or can be removed later so that the data may be stored for historical trends and comparative purposes. Local device time can be set periodically over the connected network or can initially be provided through a hand-held device if time is not available over the network connection.

In another example, position as well as time data can also be provided by a Global Positioning System (GPS) receiver so that the actual location of the sensor can be determined. The GPS system can either be part of the data recording system or contained within the hand-held device the installer might be carrying.

In another embodiment, an onboard LED or display unit is provided that gives the installer an indication of local status without having to use a hand held device, and onboard push buttons, jumpers and switches are provided which allow the installer or user to force the unit into known states or command specific actions.

In another embodiment, the sensors and data package are duplicated, where there is one system in multiple locations either on a single meter or on multiple meters throughout the building or on compound meters (those which detect both low flow and high flow). For the purposes of reading compound meters, a single unit may have a plethora of magnetic field sensors. Time is synchronized between these systems and data is time stamped and recorded such that the data can be correctly combined and the disaggregation algorithms can run more efficiently.

In another embodiment, the existing meter may be mounted on the outside of the building and may even be underground. In these cases, a wired connection providing both communications and power may be required.

Local processing functions provide the installer with information to best facilitate sensor placement. Information on the detected signal quality (signal amplitude and local noise) is provided either visually on the unit or through a local hand-held interface. The user has instantaneous information so that he or she knows whether or not a successful installation is possible at a particular position or within a particular environment.

A device calibration algorithm is locally provided which learns the magnetic signature of the meter and creates a unique calibration pattern for that meter and how the sensors are installed on the meter. By manually entering the physical meter's readings at two or more specific points in time, the local calibration can be matched to actual flow rates and the device is then able to provide precise flow information.

As a meter records flow the magnetic field changes, as previously described. Various meter types have different magnetic signatures. Some meters have a signature which is almost a perfect sine wave on all three axes. These signatures are easily detected and can be represented by a circular or elliptic pattern in space. This can then be subdivided into small segments and small motions then determined as the field passes each segment. Other meters may present as having two sine waves, one a frequency f1 and the other at frequency f2 where f2 is twice f1 and the two frequencies are interposed on each other which present a field pattern that resembles more of a folded figure eight in space. This pattern can also be segmented in space and small motions tracked. These frequencies are indicative of the actual frequency of the meter's rotation.

Some meters also exhibit a third very low modulation frequency which is then added to the higher frequencies creating a very long cyclic pattern, one that would take a very large memory to store and a long period of time to learn. This very low frequency is typically twenty-five (25) to fifty (50) or more times smaller than actual rotation frequency of the meter, are extraneous, because they do not contain any pertinent data regarding flow rate. In this case the algorithm can detect this type of meter, learn the higher frequency patterns and ignore the lower frequency patterns which provide no additional information. A constant adjustment is made by initiatively relearning the meter signature which effectively removes the low frequency component. This is also useful if the sensors position were to change or if there were some change in the background magnetic field or as the meter ages and the mechanical characteristics change. Without this constant adjustment, simple peak detection algorithms might miss peaks and thus miss flow information.

Learning meter patterns can take time, particularly if the meter motion is slow. This time can represent lost measurements. The learning process starts by first simply detecting the minimum and maximum of the magnetic signal and setting a course threshold and hysteresis. Single revolutions can then be quickly detected, however fine motions cannot be easily resolved into flow. To resolve fine motions into accurate flows the meter motions must be observed of several (a plurality of) revolutions and the pattern estimated through a more sophisticated learning algorithm. This approach of fast course detection followed by fine, more accurate detection allows for fast calibration and tracking times for meters with initially low flow rates and allows for the minimum of missed revolutions when the sensor is initially installed and activated.

A Human Machine Interface (HMI) is provided where a local display is used to give immediate usage feedback to building owner. In this system the building owner can program alarms, alerts or performance goals into the HMI and the system will provide feedback to the building owner in the form of email, text message or other means to reach the user.

A cryptographic signature device is provided such that the device may provide a digital signature, access credentials and data encryption to protect sensitive usage and performance data so that other competitors or unwanted parties cannot monitor how another building is performing or what particular techniques they are using to improve efficiency or protect against malicious modification of reported data or to prevent denial of service attacks. By utilizing asymmetric cryptographic keys, assigning each device a unique public key/private key pair, device maintenance activity (firmware upgrades, device configurations, device functional options) can be encrypted and matched uniquely to every device in the field. This then provides the ability to manage each device individually and to generate revenue on a per-device basis. By encrypting firmware upgrades with a unique symmetric encryption key that is provided and encrypted with the device's public key, the firmware delivery then becomes unique to that device. Additional features such as grouping upgrades for a family of devices under a single key can also be done allowing a fleet of similar devices to be upgraded with a single firmware bundle.

A firmware or configuration upgrade file is associated with a certificate file. The certificate is encrypted with the device's public key and inside the certificate are symmetric encryption keys which are used to encrypt and decrypt the firmware file and optionally the configuration file. The certificate also contains a nonce to make it unique. In addition, check sum information is provided so that the device can verify that after decryption, the files provided with the certificate are valid.

In some cases, an end user may have a plethora of devices which need to be managed all in the same way. Dealing with individual files for each device can then become burdensome. In this case a special certificate file is used which is encrypted with a group public key and every device in the group has the private key for that group and can decrypt the certificate. Additional information is then provided which will identify the members of the group who are permitted to access the data and decryption keys are provided for those devices.

The above mechanism provides security to ensure only devices with permission to use a particular upgrade and access that upgrade will be able to use the upgrade. But it does not guarantee that the upgrade came from a trusted source. For that, a challenge response mechanism is utilized wherein the device will send a challenge message encrypted with the source's public key and the source must respond with the appropriate response which is based on information contained in the challenge. This can then be used to establish a secure connection between the source of information and the destination. This technique is well understood by those versed in the art.

The devices may also have a connection to the internet cloud where the internet cloud or user data cloud can be a data server or a plurality of data servers which provide data processing, data storage and display rendering data for local display units. This is commonly known as cloud computing or cloud services. These cloud services are provided by a plurality of service providers.

To prevent cyber-attacks on the device and to allow the device to be accessed remotely through firewalls or behind gateways the device can establish a secure remote connection to a server which will then act as a relay point or broker for messages. Once the device makes a connection to the remote broker it can retain that connection or it can close the connection and reopen it at other times. Such times can be programmed, random or periodic. Messages can be queued in the broker much like a mail box where the mail is received at later points in time and mail is posted or sent when the sender is ready to send it. Commands for specific actions and notification of status can be achieved this way.

Device connections can be made either wired or wireless or in a combination of the two. A wireless connection for local device configuration or commissioning can also be provided. Automated device commissioning and authentication can be made locally with a mobile device such as a cell phone utilizing Bluetooth connectivity and secure Cellular data or secure WiFi connectivity to the Internet.

The devices may also be connected to a local building management system or local gateway that can perform the data analysis required by the building owner; it does not need to be connected to the cloud. Comparative analytics showing usage data between buildings, building units or various device types that consume resources can be provided.

We refer now to FIG. 1 which illustrates one example of a meter 101 with a mechanical register 102 attached. Fluid or gas 108 flows into opening 103 and then the fluid or gas 109 flows out opening 104. Another embodiment might utilize an electronic meter where the fluctuating magnetic field is sensed electronically within the meter. Yet another embodiment might include a meter with both mechanical components and electrical components where the fluctuating magnetic field drives the mechanical components and the electronic components read the position of the mechanical components and provide an electronic display and may also report the readings back to the utility through a wireless interface.

When the fluid or gas is flowing, drum 105 rotates. Drum 105, which is a mechanical metering component, has a magnet 106 attached that also rotates and is magnetically coupled to magnet 107 which rotates with magnet 106 by virtue of this magnetic coupling. Register 102 contains mechanical gears and dials which then provide an approximate indication of the total amount of fluid or gas that has flowed through the meter. Some fluid or gas may pass around drum 105 and not be detected by the meter. Fluid or gas may also flow so fast through the mechanism inside the drum that the register is unable to keep up and it will slip and miss a rotation. It is also possible that flow is so slow that it simply leaks around drum 105 and the drum never turns. These very low flow rates can be detected by acoustic or ultrasonic sensor 113 whereas the magnetic fluctuations created by the motion of the drum are detected by magnetic sensor 110.

An off-board humidity sensor 112 can be added to the system at a distance from the meter (in a physically lower position such as the floor of basement) to detect leaks that may occur and are not detectable by the system. Temperature sensor 111 can be used to detect ambient temperature and to therefore provide a warning of possible freezing. This sensor can also be used to measure the temperature of the pipe and in the case of a metal pipe the temperature of the fluid can also be determined when the fluid is flowing.

Figure 2:
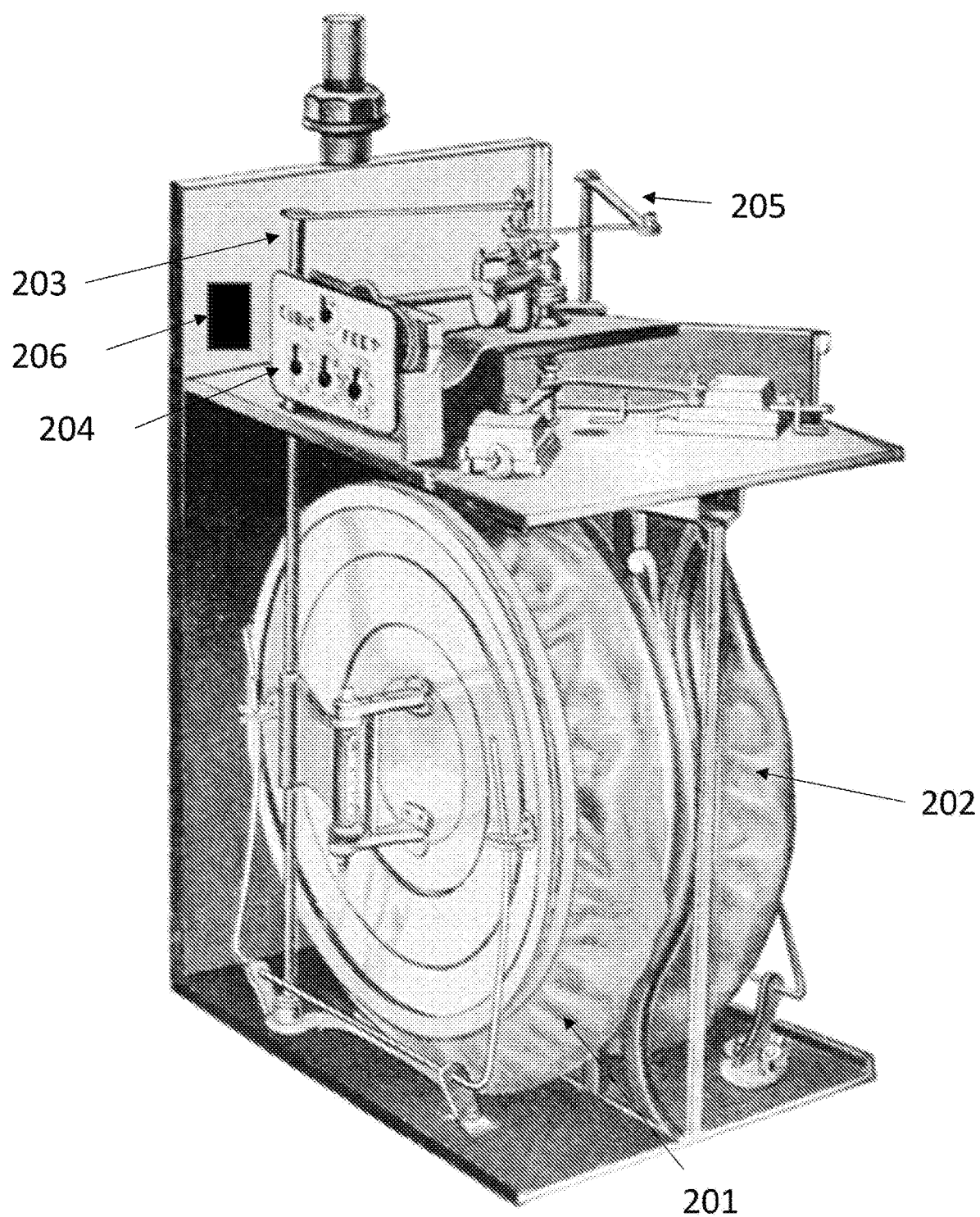
FIG. 2 comprises a diagram of a diaphragm meter with register attached.

FIG. 2 illustrates one example of a diaphragm meter where fluid or gas fills a first diaphragm 201 and compresses a second diaphragm 202 and drives lever 203 which when full will cause diaphragm 202 to fill and compress diaphragm 201. These diaphragms 201, 202 are the mechanical metering components of this meter. This back and forth expansion and contraction of diaphragms 201 and 202 and the motion in levers 203 and 205 move the dials in the register 204 recording the flow. The movement of these ferrous metal linkages cause enough disturbance in the local magnetic fields such that magnetic sensor 206 can sense the repetitive movements inside the meter. Using these repetitive movements, a signal signature can be learned.

Figure 3:
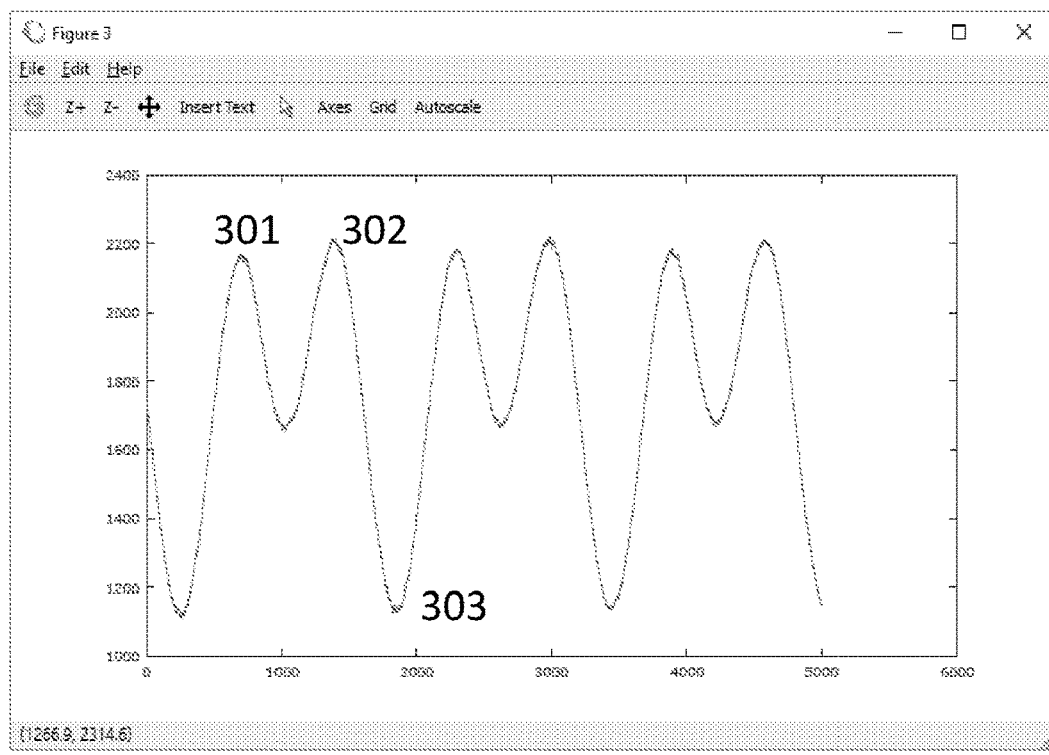
FIG. 3 illustrates actual data from a single magnetometer.

Referring now to FIG. 3 we see actual waveforms recorded by a single axis magnetic sensor located on the side of a Neptune water meter, used as an example, without limitation. The waveform is repetitive and is comprised of multiple frequencies with the predominant ones being frequency 1 and frequency 2 where frequency 2 is twice frequency 1. This causes two main positive peaks 301 and 302 and one negative peak 303. Utilizing a standard threshold detector algorithm, one skilled in the art could detect these two peaks by setting a threshold much higher than the average.

Figure 4:
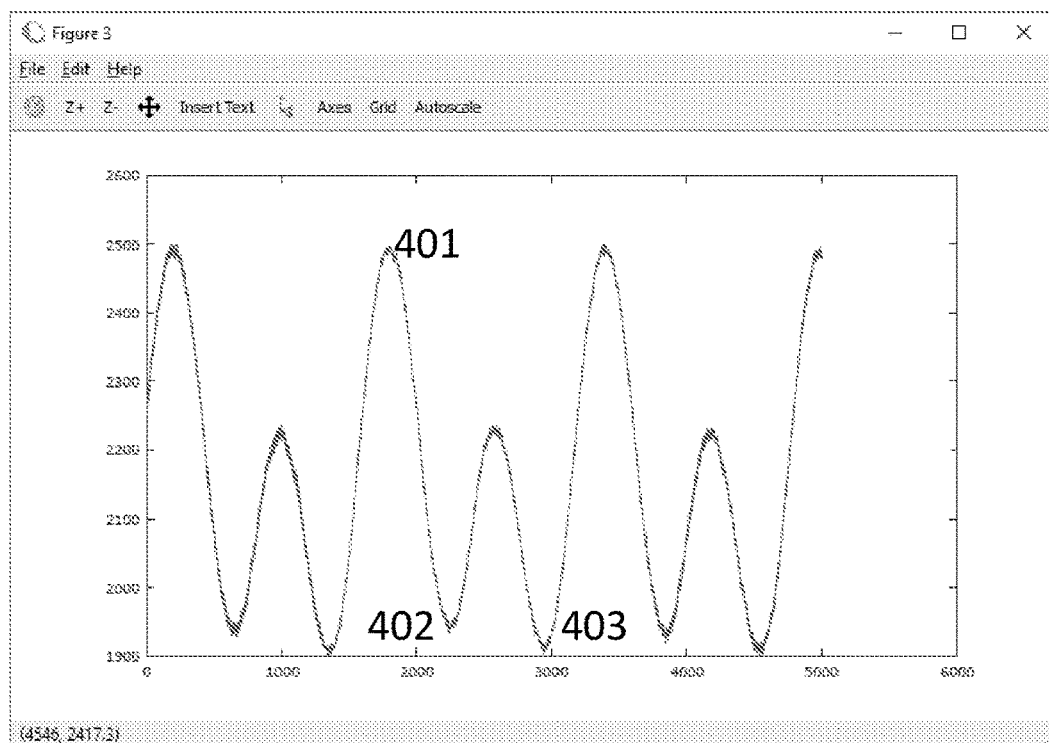
FIG. 4 illustrates actual data from a single magnetometer used for comparison.

Referring now to FIG. 4 we again see an actual waveform, but this time the magnetic sensor has been placed in a different location and now there is one positive peak 401 and two negative peaks 402 and 403. A high value threshold would only detect every other negative peak and thus count half as often as would occur give the waveform of FIG. 3.

Figure 5:
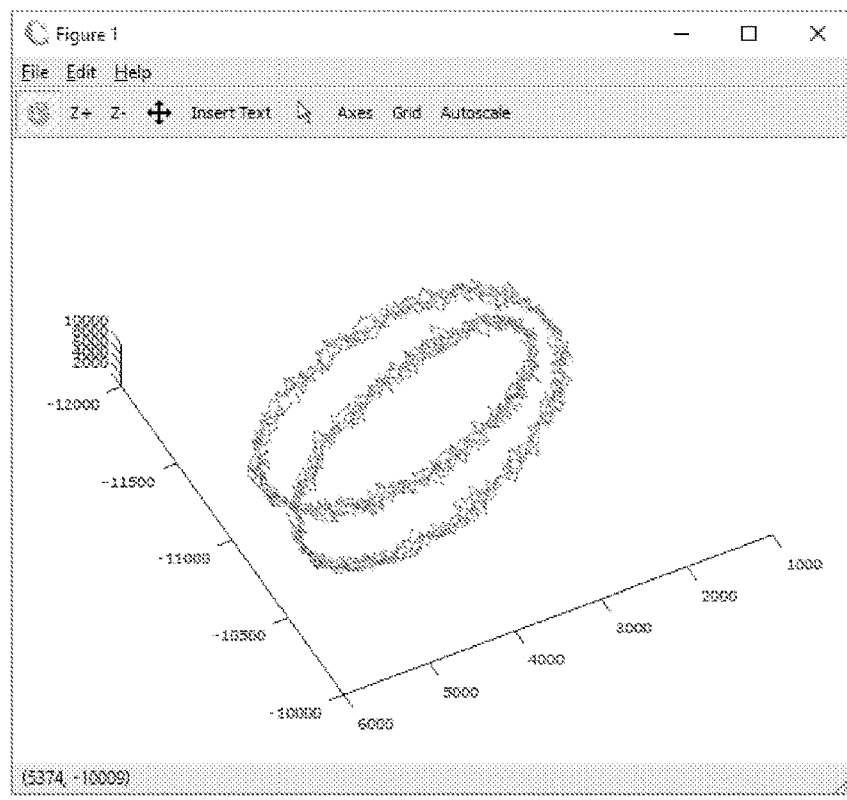
FIG. 5 illustrate raw data from a 3-axis magnetometer taken on a nutating water meter.

Referring now to FIG. 5 we see the same raw data shown in FIG. 3, but now also including all three axes. Although it is difficult to see given the flat representation, the path of the magnetic field when measured in three dimensions never crosses and therefore following this path eliminates the confusion of whether or not there are two peaks or one as described in FIGS. 3 and 4. By learning the path of the magnetic field in three-dimensional space we can accurately determine the flow without ambiguity.

Figure 6:
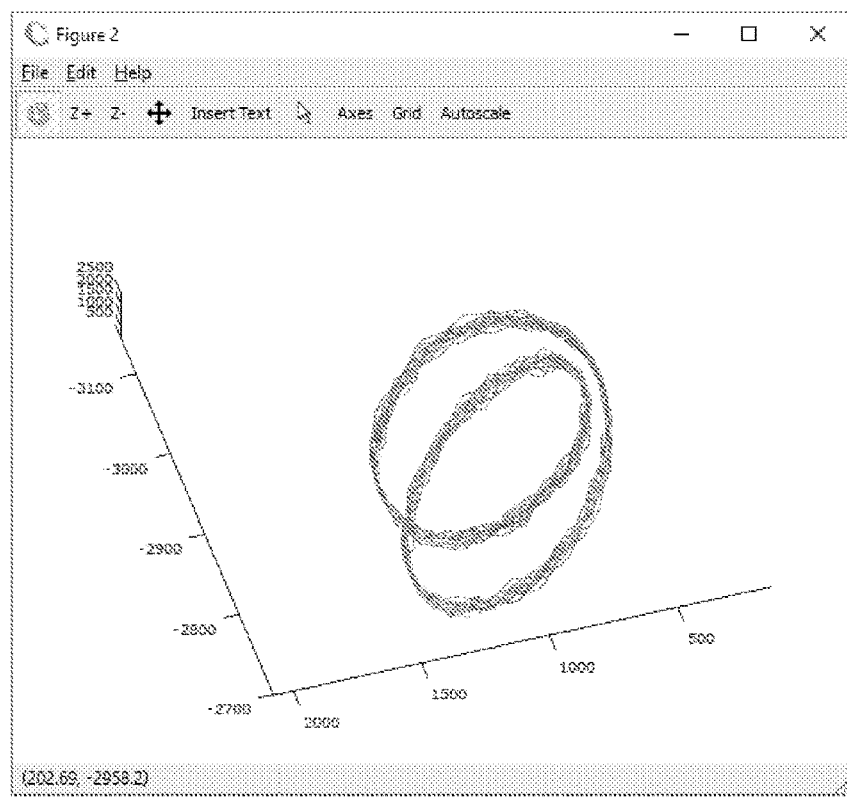
FIG. 6 illustrates filtered data from a 3-axis magnetometer taken on a nutating water meter.

Referring now to FIG. 6 we see a filtered representation of the data in FIG. 5. Although the data in FIG. 5 has fairly high fidelity there are cases where there may be much more noise in the data. The data in FIG. 6 has much less noise than the data in FIG. 5 by a factor of 5 dB due to the filtering process. This allows us to more accurately determine where on the waveform in FIG. 6 the meter position is and thus estimate flow at a much finer granularity than an algorithm that would just count peaks as described previously.

Figure 7:
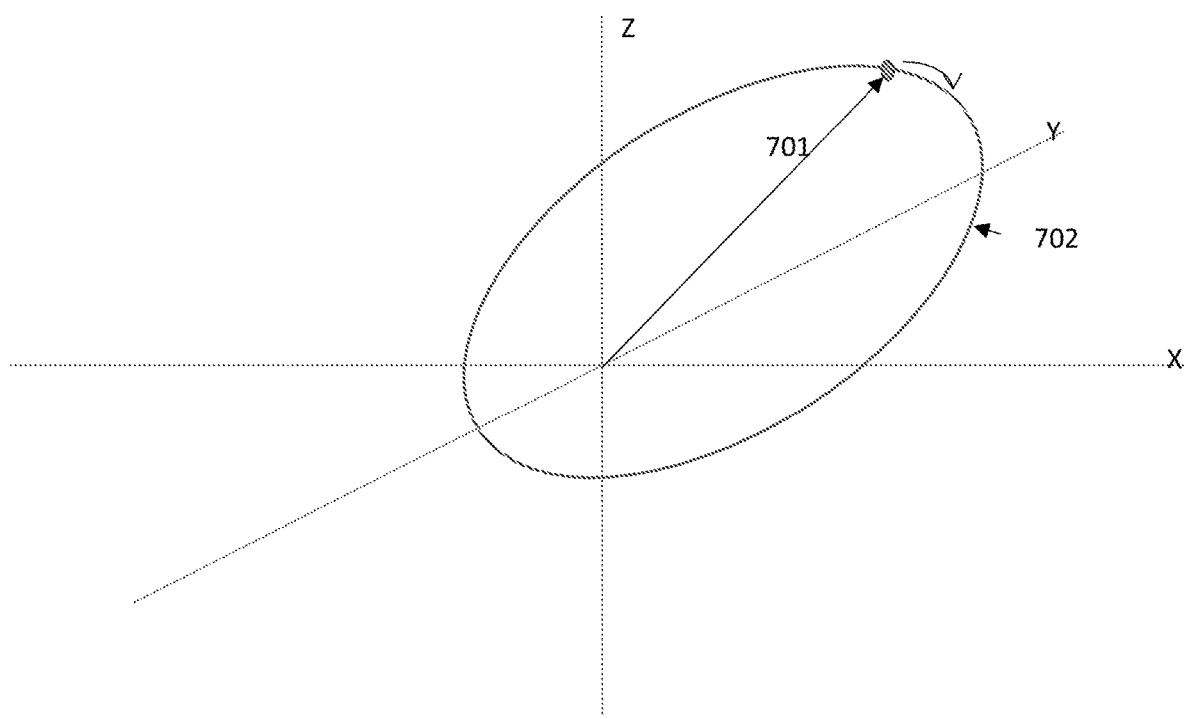
FIG. 7 illustrates a notional the 3-dimensional path of the magnetic field vector created by the rotating magnet inside the meter chamber.

Referring now to FIG. 7 we see a notional example of a graph of the magnetic field vector 701 plotted in three-dimensional space without noise as it rotates around a path 702. The vector is oriented along the south-to-north pole directions (or vice versa) of the magnetic field, so that it is not necessary to show the magnetic field lines themselves. Notice that this vector path is not round nor does it rotate around any one axis nor is it centered. This is a notional representation for example not limitation, because certain meter types will have paths that appear more as a figure-8 in space. The shape and orientation of the path will vary based on the meter and how the sensor is mounted on the meter. The axis offsets are affected by the earth's magnetic field as well. The electronics of the invention learn the path and its rotation and offsets based upon the unique meter signature and the way the sensors are mounted. Once the path is learned and the normal path is understood, the electronics can start to track the magnetic field vector and record how the internal drum is rotating, or in the case of a meter which utilizes levers learn the repetitive magnetic field fluctuations, and thus how much fluid or gas is passing through the meter.

As the meter ages the magnetic field vector path may change. The electronics can sense these changes. The amount of deviation from the normal path 702 along with any abnormal sounds or vibrations can be used to indicate that a meter is no longer functioning properly.

When instantaneous flow data from the meter is matched with point of use data or against historical patterns of usage sudden anomalies can be detected such as a rapid loss of pressure in gas signifying a leak or rapid or minute flow at an unexpected time also representing a leak.

When a gas supply network pressure fluctuates, individual building meters rotate as the pressure inside the buildings fluctuate. This reaction creates a magnetic field profile which can be detected. This trait is especially important when the pressure change is a catastrophic over-pressurization, which might result in appliance piping damage, and potential risk to life and property.

Figure 8:
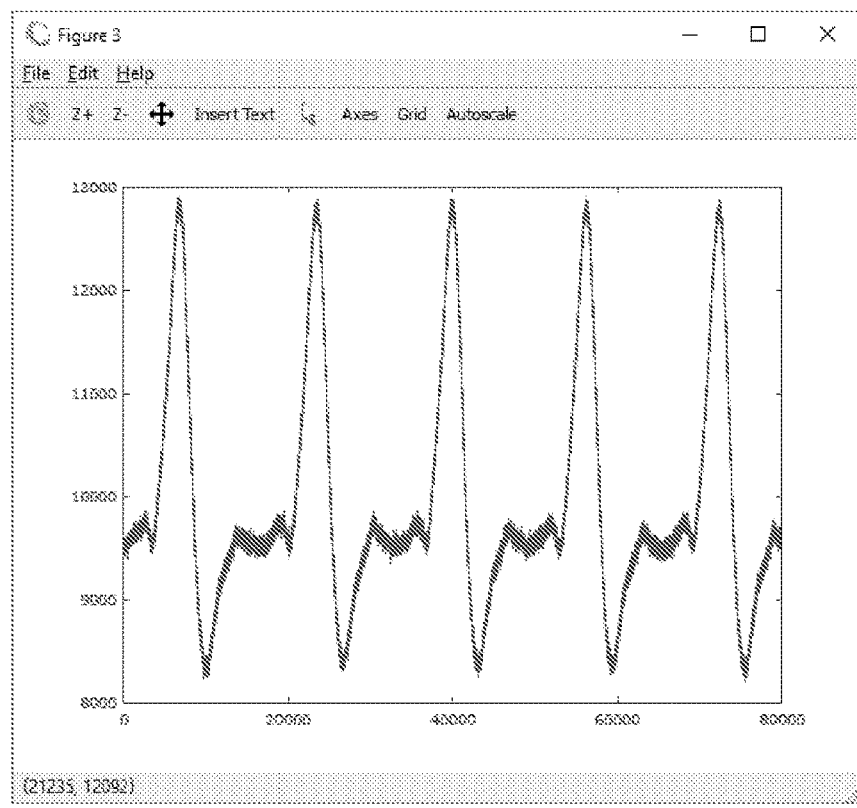
FIG. 8 illustrates data from a single axis magnetometer from a diaphragm meter.

FIG. 8 illustrates actual single axis magnetic sensor data from a diaphragm meter. Here we see a sharp peak. These peaks would be easy to detect with a simple peak detection algorithm but we would not have a fine measurement of the flow.

Figure 9:
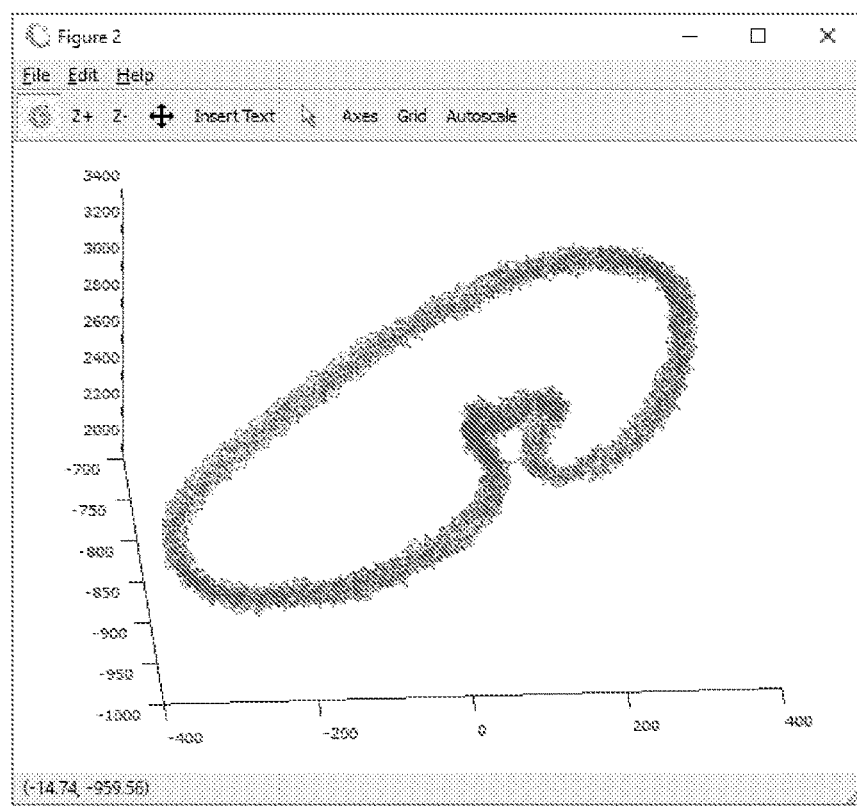
FIG. 9 illustrates data from a 3-axis magnetometer taken on a diaphragm meter.

FIG. 9 illustrates the actual three-axis magnetic sensor data from a diaphragm meter. Here we see that there is a very detectable path as was seen in the previous examples. By utilizing all three axes it becomes possible measure flow to a much finer granularity.

Figure 10:
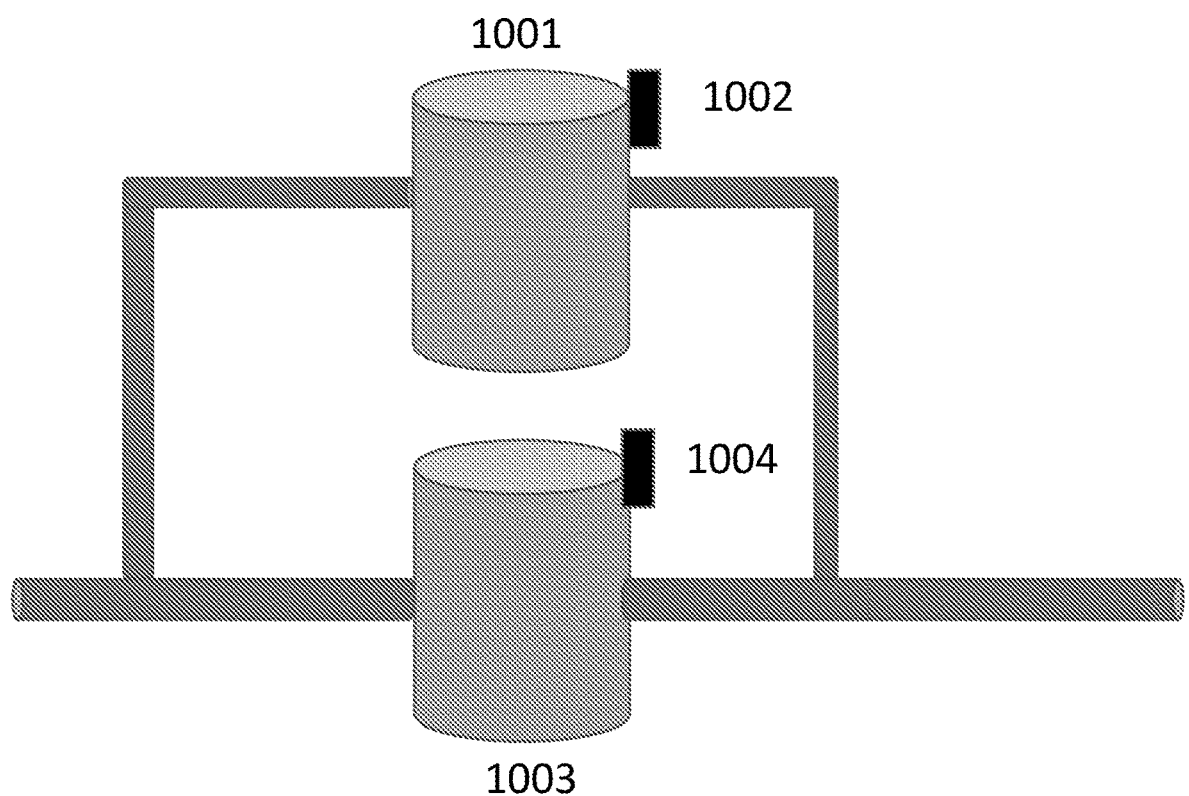
FIG. 10 illustrates a compound meter.

FIG. 10 illustrates a compound meter system. Here two meters are used to measure flow when the flow rates are higher than the capacity of a single meter and yet a fine measurement is desired. By placing magnetic sensor 1001 on meter 1002 and magnetic sensor 1004 on meter 1003 both meters can be tracked simultaneously to provide an indication of the compound flow. A plurality of meters can be interconnected in this fashion resulting in a system of meters where each individual meter has a magnetic sensor attached. By combining the readings of the plurality of sensors a measurement of total flow through the meter system can be provided.

Figure 11:
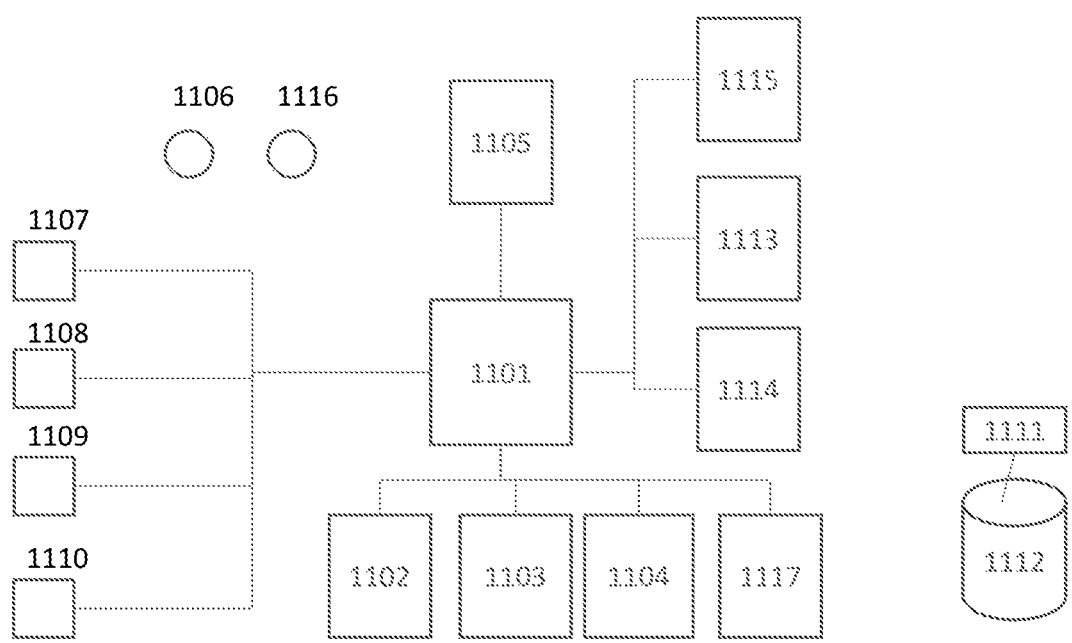
FIG. 11 comprises a block diagram of the subsystem that contains the magnetic field sensors and the local processing required.

FIG. 11 illustrates the electronics used to perform the real time signal processing and communications at the sensor. Microprocessor 1101 executes a program contained in Random Access Memory 1102, Read Only Memory 1103 and Non-Volatile Memory 1104. Local measurements are also stored in Random access memory 1102. Trusted Platform Module 1105 contains security information and algorithms as well as device specific security credentials. Indicators and Displays 1106 are used to display status locally without the need for any other device. A plurality of Multi axis Magnetic field sensors 1107 measure the fluctuating magnetic fields given off by the internal magnet variations within the flow meters. These readings are fused together to create a measurement of the internal position of the rotating drum or diaphragms. This fused data provides the fundamental information for determining what the meter system is actually reading and also provide any information on the health of the meter system. Vibration and acceleration sensors 1108 provide additional information which can be used either independently or in conjunction with any combination of the other sensors to detect meter system health, meter tampering, hammer or even minute flows too small for the meter system to detect. Additional Temperature and Humidity Sensors 1109 and Acoustic Sensors 1110 can be added to provide additional environmental information. In general, any combination can be included to provide a wide range of capabilities. Voltage regulator and safe charging circuit 1111 and Battery 1112 are added to allow the unit to operate during power outages and to safely charge the battery when power is available. A Remote Communications Module 1113 can include a wired communications network such as Ethernet or a wireless network such as Cellular, or WiFi and any desired wired or wireless communications mechanism. Local Provisioning and maintenance communications module 1114 which is independent of communications module 1113 can be added if an independent method is required during the installation or during a maintenance operation. GPS module 1115 can be added to provide absolute position information if desired. A Removable memory cartridge 1117 can be added to provide commissioning data and to provide the ability to record and log diagnostic data and measurement data which can be removed and analyzed later.

Figure 12:
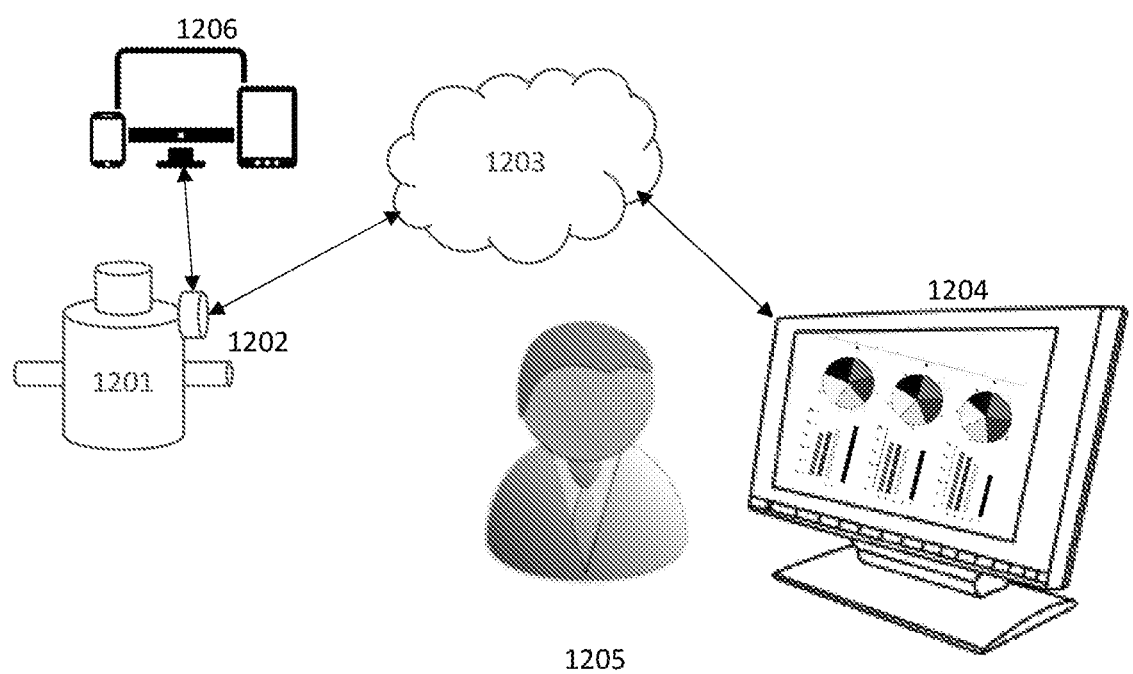
FIG. 12 comprises a block diagram of a system for which the local sensor processing is connected to a cloud server used for providing information to a property owner, property manager, resource consumer or resource aggregator.

FIG. 12 illustrates the meter system 1201 with the attached meter sensor 1202 communicating to the internet or cloud services 1203 which receives periodic information about what the meter or a plethora of installed meter sensors are reporting. The data is consolidated and processed in the cloud 1203 and made available to the user 1205 on a remote display 1204 or locally on a mobile device 1206. Multiple graphs, charts and indicators can be provided and the data from multiple devices can be reported simultaneously on display 1204. A local diagnostic connection utilizing commonly available hand-held devices such as a smart phone 1206 is also provided. Device 1206 can also be used for device configuration.

Figure 13:
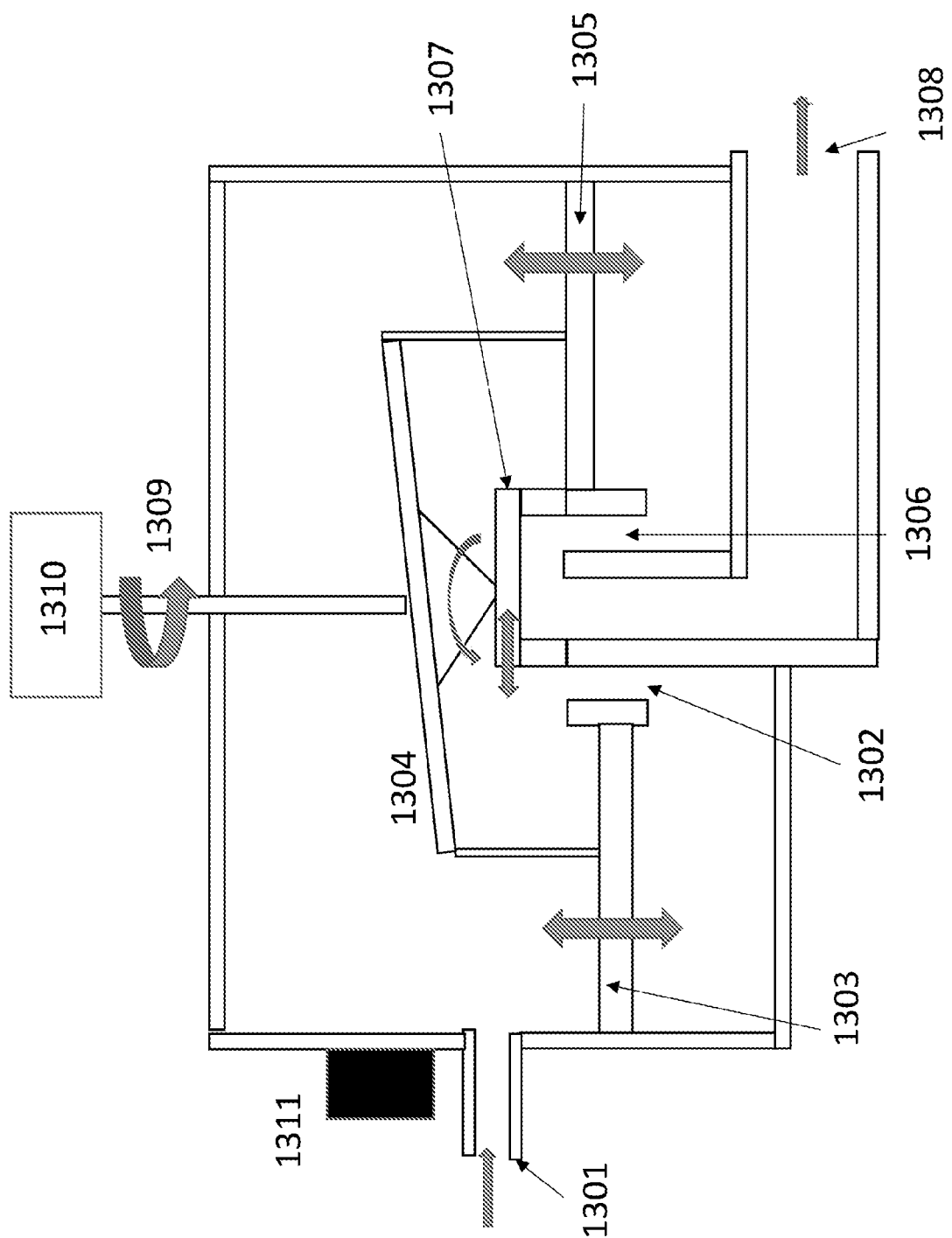
FIG. 13 illustrates a notional diagram of a piston meter with register attached.

FIG. 13 illustrates one example of a piston type flow meter where fluid or gas enters port 1301 and flows into internal port 1302 to push piston 1303 upward which causes wobble plate 1304 on pivot and forces piston 1305 down. Piston 1305 then pushes fluid or gas out port 1306 and the motion of wobble plate 1304 causes the valve plate 1307 to move horizontally. Fluid or gas flowing out of port 1306 then exits the meter through opening 1308. When valve plate 1307 slides completely over the roles of the pistons reverse. There are usually three or more of these valves in a piston type meter and wobble plate 1304 will make a circular wobble motion driving shaft 1309 which will intern drive register 1310 which then registers the volume which has passed through the meter. Sensor 1311 is attached at a location on the outside of the meter body and detects the magnetic field fluctuations created by the internal motions of the meter.

Figure 14:
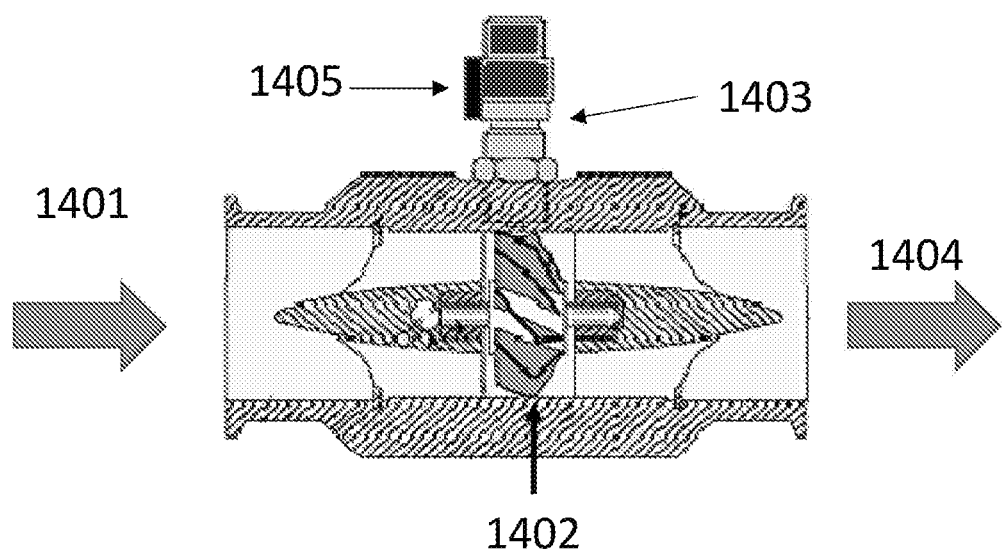
FIG. 14 illustrates a notional diagram of a turbine meter with register attached.

FIG. 14 illustrates one example of a turbine type flow meter where fluid or gas enters port 1401 and drives turbine 1402 which then drives a rotational shaft leading up to register 1403. Fluid or gas exits the meter through 1404. Sensor 1405 is attached to the body of the meter and detects the magnetic fluctuations caused by the internal motions of the mechanical mechanism inside the meter.

Note that in general, all four types of metering components discussed here, namely drum, diaphragm, piston and turbine, may or may not comprise a magnetization thereof. In the instances where the metering component does not carry its own magnet, as noted earlier, existing magnetic fields in the environment are altered or fluctuate as a function of the position of ferrous material of the metering component, when that ferrous material is unmagnetized.

It will be appreciated by those skilled in the art that modifications to the foregoing embodiments may be made in various aspects. Other variations clearly would also work, and are within the scope and spirit of the invention. It is deemed that the spirit and scope of that invention encompasses such modifications and alterations to the embodiments herein as would be apparent to one of ordinary skill in the art and familiar with the teachings of the present application.

The device is not restricted to data processing of a single sensor. Multi-meter systems described above can be tracked where there is a high flow and low flow meter. Together they give a total flow. However, since the device is capable of tracking multiple meters it can also track both a water and a gas meter simultaneously thus reducing installation costs for customers wanting both.

In some cases, the meter signature might be so complex that tracking flow is not possible given the limited processing power of the system. In this case, raw or semi-processed magnetic field measurements can be passed to a more capable system to be analyzed and flow or other meter related information extracted.

The device can be part of larger building sub-metering sensor installation providing whole-building water and gas usage data to compare against the sub-metered water and gas usage data in order to reach conclusions about the efficiency of a building.

The meter magnetic field signature can be learned by taking many magnetic field readings through a few meter rotations, or by taking few magnetic field readings through many meter rotations and combining the readings. This feature is useful when flow is so high, and meter rotations are of such high speed, that it is not possible to reach calibration through the normal path.

The knowledge possessed by someone of ordinary skill in the art at the time of this disclosure, including but not limited to the prior art disclosed with this application, is understood to be part and parcel of this disclosure and is implicitly incorporated by reference herein, even if in the interest of economy express statements about the specific knowledge understood to be possessed by someone of ordinary skill are omitted from this disclosure. While reference may be made in this disclosure to the invention comprising a combination of a plurality of elements, it is also understood that this invention is regarded to comprise combinations which omit or exclude one or more of such elements, even if this omission or exclusion of an element or elements is not expressly stated herein, unless it is expressly stated herein that an element is essential to applicant's combination and cannot be omitted. It is further understood that the related prior art may include elements from which this invention may be distinguished by negative claim limitations, even without any express statement of such negative limitations herein. It is to be understood, between the positive statements of applicant's invention expressly stated herein, and the prior art and knowledge of the prior art by those of ordinary skill which is incorporated herein even if not expressly reproduced here for reasons of economy, that any and all such negative claim limitations supported by the prior art are also considered to be within the scope of this disclosure and its associated claims, even absent any express statement herein about any particular negative claim limitations.

Finally, while only certain preferred features of the invention have been illustrated and described, many modifications, changes and substitutions will occur to those skilled in the art. It is, therefore, to be understood that the appended claims are intended to cover all such modifications and changes as fall within the true spirit of the invention.

We claim:

1. A system for precisely monitoring fluid or gas flows, comprising:
    a flow meter comprising a mechanical metering component;
    said mechanical metering component comprising a ferrous material;
    a three-axis magnetic field sensor for sensing fluctuations of a magnetic field, said fluctuations arising from movements of said ferrous material, and specifically, for sensing a magnetic field vector of said magnetic field comprising a magnitude and direction in three space dimensions of said magnetic field between south and north poles thereof;
    a computer processor and non-transient storage containing programming therein, for receiving data from said magnetic field sensor and storing magnetic field behavior data representing the time behavior of said magnetic field vector in said three space dimensions;
    calibration programming in said computer storage for analyzing and learning a magnetic signature of said meter;

programming for storing a unique calibration pattern of said magnetic signature to represent baseline behaviors thereof; and comparison programming for comparing behaviors of said magnetic field during operation with said calibrated baseline behaviors and thereby deducing the flows which are occurring during said operation as a function of time under various conditions.

2. The system of claim 1, wherein said ferrous material of said mechanical metering component comprises magnetization thereof.

3. The system of claim 2, said mechanical metering component comprising a drum.

4. The system of claim 1, wherein said ferrous material of said mechanical metering component is unmagnetized.

5. The system of claim 4, said mechanical metering component comprising a diaphragm.

6. The system of claim 4, said mechanical metering component comprising a piston.

7. The system of claim 4, said mechanical metering component comprising a turbine.

8. The system of claim 1, further comprising at least one sensor selected from the sensor group consisting of: a single-axis accelerometer; a multi-axis accelerometer; an acoustic sensor; an ultrasonic sensor; a temperature sensor; and a humidity sensor; for at least one of the sensing functions selected from the group consisting of: detecting vibrations from oscillations in flow in the manner of a water hammer; detecting removal of said flow meter; detecting tampering with said flow meter; detecting low flows which are below measurement capabilities of said flow meter; detecting whether an additional magnetic field has been introduced which is strong enough to prevent said flow meter from reading properly; detecting possible freeze conditions; detecting when the environment around said flow meter goes outside of expected normal values; detecting when the environment around said flow meter can damage said flow meter; detecting negative (opposite-direction) flows; and determining mechanical integrity of said flow meter.

9. The system of claim 1, further comprising a plurality of interconnected flow meters, each with its own said three-axis magnetic field sensor; and said programming for combining the readings of the plurality of three-axis magnetic field sensors for obtaining a measurement of total flow through said plurality of interconnected flow meters.

10. The system of claim 1, said calibration programming further comprising iteratively relearning said magnetic signature to isolate and remove any low-frequency components of said magnetic signature from said stored calibration pattern, wherein said low-frequency components are smaller than high-frequency components of said magnetic signature by a factor of at least twenty-five (25).

11. A method for precisely monitoring fluid or gas flows, comprising:

sensing a magnetic field vector of a magnetic field comprising a magnitude and direction in three space dimensions of said magnetic field between south and north poles thereof, using a three-axis magnetic field sensor for sensing fluctuations of said magnetic field, said fluctuations arising from movements of said a ferrous material of a mechanical metering component of a flow meter;

receiving data from said magnetic field sensor and storing magnetic field behavior data representing the time behavior of said magnetic field vector in said three space dimensions, into non-transient storage associated with a computer processor;

analyzing and learning a magnetic signature of said meter using calibration programming therefor;

storing a unique calibration pattern of said magnetic signature to represent baseline behaviors thereof into said computer storage; and comparing behaviors of said magnetic field during operation with said calibrated baseline behaviors and thereby deducing the flows which are occurring during said operation as a function of time under various conditions, using comparison programming therefore.

12. The system of claim 1, said calibration programming for analyzing and learning said magnetic signature further comprising programming for:

detecting a minimum and maximum of said magnetic signature and setting a course threshold and hysteresis therefrom;

detecting a magnetic signature for single revolutions; and observing a plurality of revolutions and using these to estimate fine motions; wherein:

meters with initially low flow rates can be quickly calibrated and tracked, and missed revolutions can be minimized.

13. The method of claim 11, further comprising iteratively relearning said magnetic signature to isolate and remove any low-frequency components of said magnetic signature from said stored calibration pattern, using said calibration programming, wherein said low-frequency components are smaller than high-frequency components of said magnetic signature by a factor of at least twenty-five (25).

14. The method of claim 11, wherein said ferrous material of said mechanical metering component is unmagnetized.

15. The method of claim 11, said ferrous material of said mechanical metering component comprising magnetization thereof.

16. The method of claim 15, said mechanical metering component comprising a drum.

17. The method of claim 14, said mechanical metering component comprising a diaphragm.

18. The method of claim 14, said mechanical metering component comprising a piston.

19. The method of claim 14, said mechanical metering component comprising a turbine.

20. The method of claim 11, further comprising performing at least one of the sensing functions selected from the group consisting of: detecting vibrations from oscillations in flow in the manner of a water hammer; detecting removal of said flow meter; detecting tampering with said flow meter; detecting low flows which are below measurement capabilities of said flow meter; detecting whether an additional magnetic field has been introduced which is strong enough to prevent said flow meter from reading properly; detecting possible freeze conditions; detecting when the environment around said flow meter goes outside of expected normal values; detecting when the environment around said flow meter can damage said flow meter; detecting negative (opposite-direction) flows; and determining mechanical integrity of said flow meter, using at least one sensor selected from the sensor group consisting of: a single-axis accelerometer; a multi-axis accelerometer; an acoustic sensor; an ultrasonic sensor; a temperature sensor; and a humidity sensor.

21. The method of claim 11, further comprising measuring total flow through a plurality of interconnected flow meters, using programming for combining the readings of a plurality of three-axis magnetic field sensors of said plurality of interconnected flow meters, each said flow meter comprising its own said three-axis magnetic field sensor.

22. The method of claim 11, further comprising:
  detecting a minimum and maximum of said magnetic signature and setting a course threshold and hysteresis therefrom;
  detecting a magnetic signature for single revolutions; and
  observing a plurality of revolutions and using these to estimate fine motions; wherein:
meters with initially low flow rates can be quickly calibrated and tracked, and missed revolutions can be minimized;
  using said calibration programming for analyzing and learning said magnetic signature.

\* \* \* \* \*